Aug. 8, 1950        W. P. MASON        2,518,348
APPARATUS FOR THE DETERMINATION OF VISCOSITY OF LIQUIDS
Filed Aug. 16, 1946
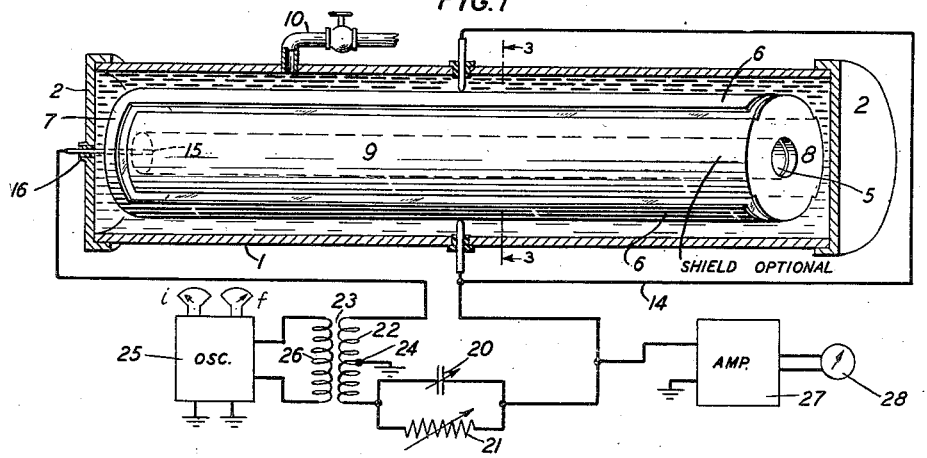
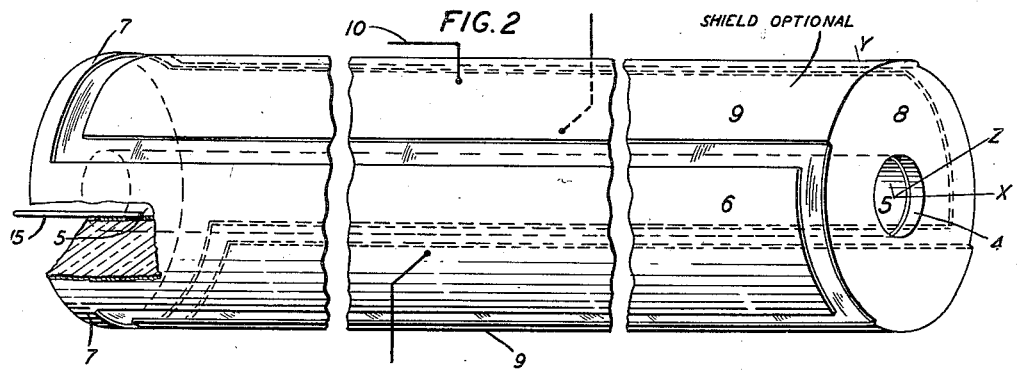
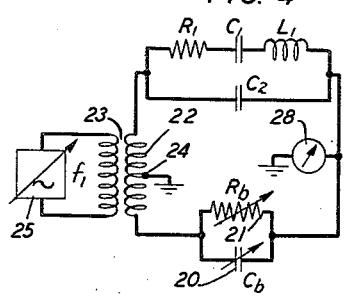
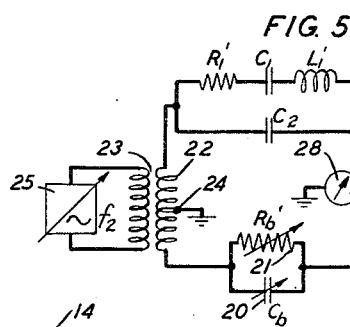
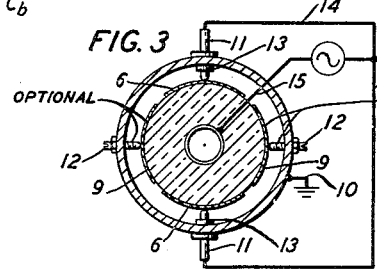
INVENTOR
W. P. MASON
BY
Harry C. Hart
ATTORNEY Patented Aug. 8, 1950

2,518,348

UNITED STATES PATENT OFFICE 2,518,348

APPARATUS FOR THE DETERMINATION OF VISCOSITY OF LIQUIDS

Warren P. Mason, West Orange, N. J., assignor to Bell Telephone Laboratories, Incorporated, New York, N. Y., a corporation of New York Application August 16, 1946, Serial No. 690,871

6 Claims. (Cl. 73—54)

This invention relates to the determination of the mechanical properties of fluids, and particularly to the determination of the viscosity and shear elasticity of fluids.

Objects of the invention are to facilitate and improve the precision of the results of fluid viscosity and shear elasticity determinations and to facilitate such determinations at high frequencies.

Application Serial No. 690,863, now Patent No. 2,515,039, filed Aug. 16, 1946, describes apparatus for launching or projecting transverse waves, including torsional waves, into transverse wave-supporting fluids. Patent No. 2,490,452, filed Aug. 16, 1946, describes an improved piezoelectric wave launching unit for applying high frequency shearing forces to such wave-supporting fluids. In one aspect, the present invention provides a high frequency piezoelectric torsional vibrator which, while it embodies some of the principles of the aforesaid Patent No. 2,490,452 is especially adapted to deliver shearing forces to fluids of any sort, whether they will support transverse waves or not. In another aspect the invention provides simple and compact apparatus for high frequency liquid characteristic determinations. In still another aspect, it provides against the masking of the desired results by undesired compression wave propagation.

The above-stated objects, as well as others, are attained, in accordance with the invention, by the provision of a cylindrical container or vessel in which is mounted a high frequency torsional vibrator, the dimensions of the vibrator being so correlated with the internal dimensions of the container as to prevent the formation and propagation of undesired compression waves which might mask the desired results of the measurements, while still permitting the existence of diffusion waves which characterize all fluids and also of transverse elastic waves which characterize certain particular fluids. An elongated cylindrical crystal, for example, a hollow cylinder of ammonium dihydrogen phosphate (ADP) with its cylindrical axis of symmetry along the X (or Y) crystal axis and having electrodes plated on its inner cylindrical surface and on quadrants of its outer cylindrical surface normal to the Z axis, serves well as the torsional vibrator. It may be centrally mounted in a cylindrical tube whose length and diameter are both slightly greater than the length and diameter, respectively, of the crystal, so as to provide space between the outer surface of the crystal and the interior walls of the vessel for the fluid whose characteristics are to be measured. The dimensions are not critical, as long as the diameter of the vessel is such that the latter, regarded as a compression wave guide, operates below the cut-off frequency for the lowest frequency mode of compression wave propagation. When the two external electrodes are connected together, and an electric field is applied between the inner electrode and the outer electrodes, such a crystal responds by twisting about its axis. Therefore, when the voltage of a high frequency source is applied to these electrodes, the crystal undergoes high frequency torsional movements, each end rotating first in one direction and then in the other direction with respect to the other end. Thus shearing forces are applied to the film of the fluid which is in contact with the crystal and corresponding twisting movements are imparted to the annular mass of fluid between the crystal and the interior walls of the container. It will be shown below that, by first measuring the impedance presented by the crystal to the high frequency source when the crystal is in a vacuum, and then measuring the impedance when the space between the crystal and the container is filled with a fluid and comparing the results of these measurements, the viscosity and shear elasticity of the fluid may be determined. The chronological order of the measurements may of course be inverted.

It is important throughout these measurements that the crystal should undergo spurious longitudinal and lateral vibrations to as small an extent as possible, and that such residual longitudinal or lateral vibrations as may exist should transfer a minimum of energy into the fluid being measured. Otherwise the loading of the crystal by fluid compression waves may be a substantial fraction of the loading by viscosity and shear elasticity, so that the results of the impedance measurements do not provide an indication of the desired quantities. This condition is secured, in accordance with the invention, by so cutting and orienting the torsional vibrator with respect to the crystallographic axes that the natural frequency of the only undesired crystal vibration mode of serious importance is very much higher than the natural torsion frequency, so that excitation of this undesired mode by an applied voltage whose frequency coincides with the natural torsion frequency of the crystal is very slight. In addition, any residual undesired ring vibrations of the crystal may be prevented from causing fluid wave propagation by adjustment of the container dimensions below the wave guide cut-off frequency for the undesired mode. This is a mode in which the cylindrical crystal undergoes alternate expansions and contractions along one of its diameters, while simultaneously contracting and expanding along another diameter at right angles to the first-named diameter.

The crystal vibrator may, if desired, be provided with a shielding coat of metal foil or plating, covering the major part of its surface which is not occupied by exciting electrodes. It may be supported in position in the container by conductive leads fixed to the various electrodes at suitable points thereof.

It is contemplated that the novel torsional vibrator of the invention may find application in other combinations and for other uses than for the measurement of fluid characteristics. Indeed, the novel vibrator may be employed for delivering shearing forces to a solid medium, or for reacting piezoelectrically to such shearing forces. Again, it may serve as a tuning element or a filter element in an electric circuit.

The invention will be more fully understood from the following detailed description of a preferred embodiment thereof, taken in conjunction with the appended drawings, in which:

Fig. 1 is a schematic diagram, partly in section, of measuring apparatus embodying the invention;

Fig. 2 is an enlarged perspective view of a torsional vibrator constructed and provided with electrodes in accordance with the invention;

Fig. 3 is a cross-section of the apparatus of Fig. 1, taken on the line 3—3;

Fig. 4 is a schematic diagram of a measuring circuit including a torsional crystal vibrator in a vacuum; and Fig. 5 is a schematic diagram of the measuring circuit of Fig. 3 modified by immersion of the torsional crystal vibrator in a viscous fluid.

Referring now to Fig. 1, a cylindrical container 1 is provided, within which there is centrally mounted a torsional vibrator of the invention. The container 1 may be of any suitable material, such as steel tubing and may be provided at either end with end caps 2 to facilitate insertion or withdrawal of the vibrator and of the fluid to be measured.

Referring to Fig. 2, which shows the torsional vibrator in perspective and to an enlarged scale, it comprises a hollow cylinder of piezoelectric material such as ammonium dihydrogen phosphate, so cut from the original crystal material that the axis of symmetry of the cylinder and its axial bore coincide with the X (or Y) crystallographic axis. The walls of the axial bore 4 are provided with an electrode 5 as by plating or coating with metal foil, or, if preferred, a metal rod may be inserted in the hole. On the external cylindrical surfaces of the crystal, electrode plates 6, for example of metal foil, are provided, substantially covering two opposite quadrants of 90 degrees, normal to the Z crystal axis. The latter are connected together, either by connections externally of the container, or, more simply, by way of a continuous complete ring or strap of plating or metal foil which joins these two external electrodes together at one end of the crystal. To minimize the effects of stray electric fields, the crystal may, if desired, be substantially shielded as by plating both flat end faces 8 and the major portion of each of the quadrants 9 which lie normal to the Y (or X) axis and connecting this conductive coating to ground as at 10.

When an electric voltage is applied between the inside electrode 5 and both external electrodes 6 this crystal responds in torsion, each end face 8 turning about the crystal axis with respect to the other end face.

Thus, for one orientation of the Z axis, application of a positive potential to the inner electrode 5 and a negative potential to the nearer (Fig. 2) external electrode 6 gives rise to shearing movements between adjacent elementary volumes of the nearer half of the cylinder, causing each element to move downward with respect to the element to its left and upward with respect to the element to its right. Similarly, application of a like negative potential to the further external electrode 6, the inner electrode 5 being maintained at the same positive potential, gives rise to shearing movements between adjacent elementary volumes of the further half of the cylinder, causing each such element to move upward with respect to the element to its left and downward with respect to the element to its right. (Reversal of the polarity of the electric potential or of the direction of the crystal Z-axis reverses these effects. Because of the mechanical rigidity of the crystal as a whole, the composition of these two shearing movements results in a twist of one end 8 with respect to the other. Substantial equality between the shearing movements of the two halves of the crystal, and consequently substantially pure torsion of the crystal as a whole, is insured by equality between the electric fields in the upper and lower halves, respectively, of the cylindrical crystal. The conductive strap 7 which connects the upper electrode to the lower external electrode ensures that these two external electrodes 6 shall always remain at the same potential, and therefore that the potential difference between either one and the internal electrode 5 is identical with that between the other external electrode 6 and the internal electrode 5. Geometrical symmetry of the crystal, obtainable by careful machining, then results in equality of the electric fields and therefore of the shearing movements.

Equality of the twisting movements over the two halves of the crystal measured from a central plane normal to the cylinder axis results in a dynamic balance between these two ends such that the central plane is a torsion vibration node. This central plane, therefore, constitutes a convenient point of support for the crystal and, in accordance with the invention, it is mechanically supported in position in the container and maintained in correct orientation by conductive straps or pins which also serve as conductors for the various electrodes. Referring to Fig. 3, two oppositely located conductive supports 11 may be fixed to the mid-points of the quadrantal excitation electrodes 6 and at diametrically opposite points of the crystal, and one or two other supports 12, located oppositely to each other and midway between the excitation electrode supports 11, may be connected to the mid-points of the skirts 9 of the shielding electrode, if used. Thus two, three, or four supports are provided in the central nodal plane, of which the first two may extend outward of the container 1 through insulating bushings 13 to make connection with excitation leads 14, while the others, if employed, may be internally fixed to the grounded container wall. The supporting excitation lead 15 for the internal electrode may extend outward through an insulating bushing 16 in the end cap 2 to provide end support for the crystal to prevent departure from axial alignment with the tubular container 1. Further support may be supplied, if desired, from an additional ground lead which connects the end shield 8 to the inside wall of the end cap 2.

Any convenient associated measuring circuit may be employed, a Wheatstone bridge circuit being shown in Fig. 1 by way of example. In this bridge circuit the crystal impedance constitutes one bridge arm and the adjacent arm comprises a balancing network, for example, an adjustable condenser 20 and an adjustable resistor 21 connected in parallel. Each of the latter should be a precision unit and should be carefully calibrated in accordance with the principles which are well known in the art of electric measurements. The two remaining arms of the bridge may consist of the two end portions of the secondary winding 22 of a transformer 23, the secondary center tap 24 being connected to ground. An adjustable high frequency generator or oscillator 25 is connected to the primary winding 23 of the transformer and thus, in effect, applies its voltage across one diagonal of the bridge circuit, while the indicating means, in this case an amplifier 27 feeding any suitable indicator or meter 28 is connected across the opposite diagonal of the bridge circuit.

In operation, the vessel 1 is first evacuated, as by pumping air out through a pipe 10, the oscillator 25 is set in operation, the frequency is adjusted to the series resonance frequency of the crystal, the bridge is balanced by adjustment of the variable condenser and the variable resistor, and the values of frequency, resistance and capacitance are noted. Referring to Fig. 4, which shows the bridge circuit schematically, the network in the upper arm is the equivalent electric circuit of the crystal and the network in the lower arm is the standard resistor-condenser balancing network. In the crystal network, $L_1$ is the effective mechanical inductance due to the moment of inertia of the crystal, $R_1$ is the effective resistance due to its internal losses, $C_1$ is the effective mechanical capacitance due to the stiffness of the crystal, and $C_2$ is the electrical capacitance between the exciting electrodes of the crystal. This equivalent circuit is well known and is described, for example, in "Communication Engineering" by W. L. Everitt (McGraw-Hill, 1932) at page 494.

When the oscillator frequency is adjusted to the series resonance frequency $f_0$ of the crystal, the reactance due to $L_1$ cancels the reactance due to $C_1$. When the bridge is in balance as indicated by a null reading of the meter 28, $$R_1 = R_b$$
$$C_2 = C_b$$

The crystal resonance frequency, $f_0$, may be determined by a minimum value of the resistance $R_b$ at balance.

The vessel is next filled with the fluid, liquid or gas, whose characteristics are under investigation. The fluid contributes both resistive loading and mass loading to the crystal, increasing the apparent resistance from $R_1$ to a new value, $R_1'$, and increasing the apparent inductance from $L_1$ to a new value, $L_1'$, as indicated in Fig. 5, which is a schematic diagram of the bridge circuit of Fig. 4, the crystal being now loaded by the fluid. In operation the frequency is again adjusted to the new series resonance frequency $f$ of the (loaded) crystal at which the reactance due to $C_1$ is cancelled by the reactance due to the modified inductance $L_1'$. This new resonance frequency $f$ may be determined as above, by a minimum value of the resistance $R_b'$ at balance. It is in general lower than the first or vacuum resonance frequency $f_0$, so that the difference, $\Delta f$, is negative. The bridge is now brought to balance by adjustment of the variable resistor to balance the modified apparent resistance $R_1'$. When balance is achieved, $$R_1' = R_b'$$

$C_2$ being unmodified by the fluid loading, is still equal to $C_b$. Thus, as a result of the measurements there are obtained a resistance increment $\Delta R = R_1' - R_1$ and a resonant frequency decrement $\Delta f = f_0 - f$.

It is shown in "Theory of Sound" by Lord Rayleigh, vol. II, section 347, that the resistive and reactive components of the impedance per square centimeter to a shearing force are equal for ordinary fluids; in particular that this impedance is given by the formula $$Z = \sqrt{\pi f \mu \rho}(1+i) \qquad (1)$$

where $$i = \sqrt{-1}$$

Using this relation, it can be shown by calculation that the measured resistance increment, $\Delta R$, and the measured frequency decrement, $\Delta f$, are related to the constants of the crystal and those of the medium in accordance with the following formulae:

$$\Delta R = (R_1' - R_1) = \frac{\gamma}{2\pi f_0^2 C_2 I}\left[R^3 + R_0^3 + \frac{R^4 - R_0^4}{l}\right]\sqrt{\pi f \mu \rho} \qquad (2)$$

$$\Delta f - (f_0 - f) = \frac{1}{2I}\left[R^3 + R_0^3 + \frac{R^4 - R_0^4}{l}\right]\sqrt{\pi f \mu \rho} \qquad (3)$$

where $\gamma = \frac{C_2}{C_1}$ is the ratio of the capacities of the equivalent circuit of the crystal, $f_0$ is the resonant frequency of the crystal in a vacuum, $C_2$ is the static capacity of the crystal, $I$ is the moment of inertia of the crystal, which is in turn equal to $\frac{\pi}{2}\rho_c(R^4 - R_0^4)$, $\rho_c$ is the density of the crystal, $R$ is the outside radius of the crystal, $R_0$ is the inside radius of the crystal, $l$ is the length of the crystal, $f$ is the new operating frequency or resonant frequency of the crystal in the fluid medium, $\mu$ is the viscosity of the fluid, and $\rho$ is the density of the fluid.

For simplicity of measurement it is convenient to evaluate all of the crystal constants and the geometrical constants for any single crystal and denote their joint effects by two new constants, $K_1$ for Equation 2 and $K_2$ for Equation 3, in which case Equations 2 and 3 become $$\Delta R = K_1\sqrt{\pi f \mu \rho}, \text{ or } \mu = \left(\frac{\Delta R}{K_1}\right)^2 \times \frac{1}{\pi f \rho} \qquad (4)$$

and $$\Delta f = K_2\sqrt{\pi f \mu \rho}, \text{ or } \mu = \left(\frac{\Delta f}{K_2}\right)^2 \times \frac{1}{\pi f \rho} \qquad (5)$$

Thus from a knowledge of the geometrical and crystal constants $K_1$ and $K_2$, the operating frequencies $f_0$ and $f$, and the medium density $\rho$, the viscosity is directly given either in terms of a measured change in the input resistance of the measuring circuit, or, for most fluids, in terms of a measured change in the crystal series resonant frequency. The method is sensitive because as shown by Equations 4 and 5 the viscosity is proportional in each case to the square of the resistance or frequency change.

In the measurement of the viscosity of gases it is found that the $\Delta R$ determination (Equation 4) is more reliable than the $\Delta f$ determination (Equation 5) because a slight wandering of the frequency $f$ may well occur in the course of the measurement process, due to temperature changes or other causes. Evidently, a small change in the frequency due to such causes has only a secondary effect on the final viscosity measurement whereas it has a first order or primary effect on the measurement as determined from the frequency change. However, in a viscous liquid, the frequency change $\Delta f$ is large compared to any spurious frequency change which may be expected, so that the $\Delta f$ determination of (5) is also a reliable measure of the quantity $$\sqrt{\pi f \mu \rho}$$

and therefore of the viscosity $\mu$. Furthermore, in the case of excessively viscous liquids, it is found that the equality indicated by Equations 4 and 5 between the resistance change term $$\left(\frac{\Delta R}{K_1}\right)$$

and the frequency change term $$\left(\frac{\Delta f}{K_2}\right)$$

fails, especially at very high frequencies. The deviations between these terms increase progressively as the frequency is increased and provide indications of the presence of a shear elasticity in the liquid and consequently of the propagation of transverse waves. The existence of shear elasticity for the very viscous liquid polyisobutylene has been demonstrated by setting up standing waves in a container with a torsional crystal, the wave velocity being measured as 3250 centimeters per second. This is only about one-fortieth of the longitudinal wave velocity for the same liquid, namely, $1.2 \times 10^5$ centimeters per second.

Instead of the simple Wheatstone bridge measuring circuit described above, an impedance measuring circuit which gives direct readings of the magnitude or absolute value of the impedance and of its phase angle may be employed instead. Such an arrangement offers some advantage in that the measured magnitudes are larger and therefore the changes in magnitude are larger; and it offers a further advantage in determining the characteristics of the high viscosity liquids which support transverse waves in that small changes in phase angle, i. e., small departures from the relation of equality between the fluid resistance and fluid reactance expressed by Equation 1 may be directly detected.

By proper design of the instrument it is possible to take advantage of the wide discrepancy between the velocity of propagation of longitudinal waves in the liquid and the velocity of propagation of transverse waves in the same liquid to set up standing transverse waves in the annular space between the crystal and the vessel wall while still preventing the formation of standing compression waves. Thus it is possible to make determinations of viscosity and also of shear elasticity without having the results masked by compression wave phenomena.

Aside from the measurement of shear elasticity, it is important in viscosity measurements that the results not be masked by compression wave effects. This is especially true because the impedance of an ordinary viscous fluid, liquid or gas, for waves of the diffusional type is substantially less than the impedance of the same fluid for compression waves. The principal interfering mode of vibration of the torsional crystal is one in which it expands and contracts along a diameter, that is, one in which one diameter is extended and the other contracted at one phase of the vibration, and vice versa, one-half cycle later.

The natural torsional frequency is inversely proportional to the length of the crystal and independent of its diameter or wall thickness, whereas the natural frequency of the interfering mode is independent of the crystal length and inversely proportional to its diameter. Therefore, by making the length of the crystal large as compared with its diameter, for example, five or more times, the natural or resonant frequency of the crystal for this interfering mode may be made high as compared with its natural torsional frequency so that, when the crystal is driven at its natural torsional frequency, very little of the undesired lateral vibrations ensue.

The residual lateral or thickness vibrations of the crystal, if they do exist, may be prevented from launching compression waves into the fluid by proper design of the container in accordance with the following principles.

The interfering mode tends to produce in the liquid a compression wave whose velocity potential may be expressed by the following formula.

$$\varphi = \Sigma_n A_n \cos 2\theta J_2\left(\frac{a_n r}{r_0}\right)\left[A \cos\left(\sqrt{\frac{\omega^2}{v^2} - \frac{a_n^2}{r_0^2}}\right)x + B \sin\left(\sqrt{\frac{\omega^2}{v^2} - \frac{a_n^2}{r_0^2}}\right)x\right] \quad (6)$$

where $x$ is the direction of propagation (axially of the guide)
$r$ is radial distance from the axis
$\theta$ is angular distance about the axis
$r_0$ is the inside radius of the guide
$\omega = 2\pi f$ is the angular frequency
$v$ is the phase velocity of a compression wave in an unconfined medium
$n$ is the mode number
$a_n$ is the $n^{\text{th}}$ root of $J_2(x)$, the second degree Bessel function, and
$A_n$ is a constant In the above formula the first root of the second order Bessel function is 3.07. If the phase constant, namely $$\sqrt{\frac{\omega^2}{v^2} - \frac{a_{n2}}{r_0^2}}$$

is a pure imaginary number, having no real component, any wave which tends to be launched will be rapidly attenuated and will not be propagated. This will be the case whenever $$\frac{\omega^2}{v^2}$$

is less than $$\frac{a_n^2}{r_0^2}$$

or whenever the diameter of the containing vessel, regarded as a wave guide, is equal to or less than $$\frac{3.07\lambda}{\pi}$$

where $\lambda$ is the compression wavelength in the medium. The corresponding cut-off frequency is given by $$f_c = \frac{3.07v}{2\pi r_0}$$

Hence, by correctly proportioning the diameter and length of the containing vessel to the diameter and length of the torsional vibrator, the instrument may be operated below the cut-off frequency for the lowest interfering compression mode while the annular space between the crystal and the interior walls of the container may still be above the cut-off frequency for transverse liquid vibrations.

Dimensions which have been found suitable in accordance with these principles are as follows:

| | Centimeters |
|---|---|
| Crystal outside diameter | 1 |
| Crystal inside diameter | 0.6 |
| Crystal length | 5 |
| Container inside diameter | 1.2 |
| Container inside length | 5.6 |

What is claimed is:

1. Apparatus for high frequency determinations of fluid viscosity which comprises a closed cylindrical container, a cylindrical piezoelectric torsional vibrator centrally and entirely located within said container, said vibrator having a plurality of conductive supports fixed thereto in a plane normal to its axis and midway between its ends and to the interior walls of the container, by way of which it is energized, the material of said vibrator being selected to minimize undesired longitudinal compressional vibrations thereof, the dimensions of said vibrator being selected to effect a substantial separation between the frequency of undesired lateral compressional vibrations and the frequency of desired torsional vibrations, the entire space between the vibrator and the walls of the container being completely filled with the fluid under test, the inside diameter of said container being not more than one and one-half times the outside diameter of said vibrator, electric circuit means for vibrating the vibrator, and electric circuit means for determining the reaction of the fluid under test on said vibrator.

2. Apparatus for high frequency determinations of fluid viscosity which comprises a closed cylindrical container, a cylindrical piezoelectric torsional vibrator centrally and entirely located within said container, the material of said vibrator being selected to minimize undesired longitudinal compressional vibrations thereof, the dimensions of said vibrator being selected to effect a substantial separation between the frequency of undesired lateral compressional vibrations and the frequency of desired torsional vibrations, the entire space between the vibrator and the walls of the container being completely filled with the fluid under test, electric circuit means for energizing the vibrator at the frequency of said desired torsional vibrations, and electric circuit means for determining the reaction of the fluid under test on said vibrator.

3. Apparatus as defined in claim 2 wherein the vibrator is provided with a plurality of conductive supports fixed thereto in a plane normal to its axis and midway between its ends and to the interior walls of the container, by way of which it is energized.

4. Apparatus as defined in claim 2 wherein the vibrator is a hollow cylinder of crystalline ammonium dihydrogen phosphate, having its longitudinal axis normal to the crystal Z axis and having a longitudinal bore therethrough, conductive electrodes plated on the external cylindrical surfaces normal to said longitudinal axis and to the crystal Z axis, and an internal electrode in said longitudinal bore.

5. Apparatus as defined in claim 2 wherein the length of the vibrator is at least five times its diameter.

6. Apparatus as defined in claim 2 wherein the length of the vibrator is at least five times its diameter and wherein the inside diameter of the container is not more than one and one-half times the outside diameter of the vibrator.

WARREN P. MASON.

REFERENCES CITED

The following references are of record in the file of this patent:

UNITED STATES PATENTS

| Number | Name | Date |
|---|---|---|
| 1,799,634 | Norton | Apr. 7, 1931 |
| 2,086,891 | Bachmann et al. | July 13, 1937 |
| 2,340,992 | Siegel | Feb. 8, 1944 |
| 2,439,499 | Williams et al. | Apr. 13, 1948 |

OTHER REFERENCES

Ser. No. 337,106, Jahn et al. (A.P.C.), published May 18, 1943.